United States Patent

Bolinger

[15] 3,684,896

[45] Aug. 15, 1972

[54] FLASHER CIRCUIT WITH SHORT PROTECTION

[72] Inventor: John F. Bolinger, Michigan City, Ind.

[73] Assignee: Meridian Industries, Inc., Southfield, Mich.

[22] Filed: Aug. 26, 1970

[21] Appl. No.: 67,023

[52] U.S. Cl. ..................307/202, 307/247, 307/255, 307/246, 307/260, 317/33 SC, 331/113 R

[51] Int. Cl. ..............................................H02h 7/20

[58] Field of Search .317/33 R, 33 SC; 307/202, 240, 307/247, 255, 246, 260; 331/113 R

[56] References Cited

UNITED STATES PATENTS

| | | | |
|---|---|---|---|
| 3,588,612 | 6/1971 | Leathem | 307/202 X |
| 3,343,036 | 9/1967 | Steen | 317/33 X |
| 3,359,434 | 12/1967 | Galluzzi | 317/33 X |
| 3,366,871 | 1/1968 | Conner | 317/33 X |
| 3,566,199 | 2/1971 | Kolster | 317/33 |

*Primary Examiner*—John S. Heyman
*Attorney*—Barnard, McGlynn & Reising

[57] ABSTRACT

A flasher circuit has a power transistor controlling a circuit with a load therein; a multivibrator produces a timed pulse signal applied to the power transistor for turning the power transistor "on;" and additional voltage sensing means operatively coupled to the load or power transistor and sensitive to the voltage drop across the emitter base diode thereof due to the occurrence of a short is effective to cause said power transistor to become non-conductive when said voltage drop exceeds a predetermined value.

7 Claims, 2 Drawing Figures

PATENTED AUG 15 1972 3,684,896

INVENTOR.
John F. Bolinger
BY
Wimmel & Romanski
ATTORNEYS

FLASHER CIRCUIT WITH SHORT PROTECTION

BACKGROUND OF THE INVENTION

Heretofore various circuits have been proposed for use as flasher circuits. However, such flasher circuits, expecially when employing transistors for the load circuit, are susceptible to damage resulting from high current flow through the load circuit occasioned by the occurrence of a short in the load.

Various forms of short protection means have been proposed by the prior art; however, they have not been entirely successful. For example, some, at the occurrence of a poor short, were incapable of shutting-down the power transistors while others were successful in partially shutting-down the power transistor but only to such values wherein the transistor was still susceptible to failure because of either the remaining relatively high current value or the internal heat generation resulting therefrom.

Accordingly, the invention as herein disclosed and described is directly concerned with the solution of the above as well as other related problems.

SUMMARY OF THE INVENTION

According to the invention, a switching circuit for connection to a load circuit including electrical load means, comprises a load switching transistor having a first emitter electrode a first collector electrode and a first base terminal, said load transistor being arranged as to have said emitter and collector electrodes connected in circuit with said load circuit and said electrical load means, first means effective for applying an actuating electrical signal to said first base terminal in order to thereby cause said load transistor to become conductive and complete a circuit through said emitter electrode and said collector electrode to said electrical load means in order to thereby energize said electrical load means, and second means operatively connected to and sensitive to the voltage drop across said first base terminal and one of said electrodes, said second means being effective whenever said voltage drop is at least of a predetermined magnitude to prevent said first means from applying said actuating electrical signal to said first base terminal.

Various general and specific objects and advantages of the invention will become apparent when reference is made to the following detailed description considered in conjunction with the accompanying drawings.

DESCRIPTION OF THE PREFERRED EMBODIMENTS

Figure 1:
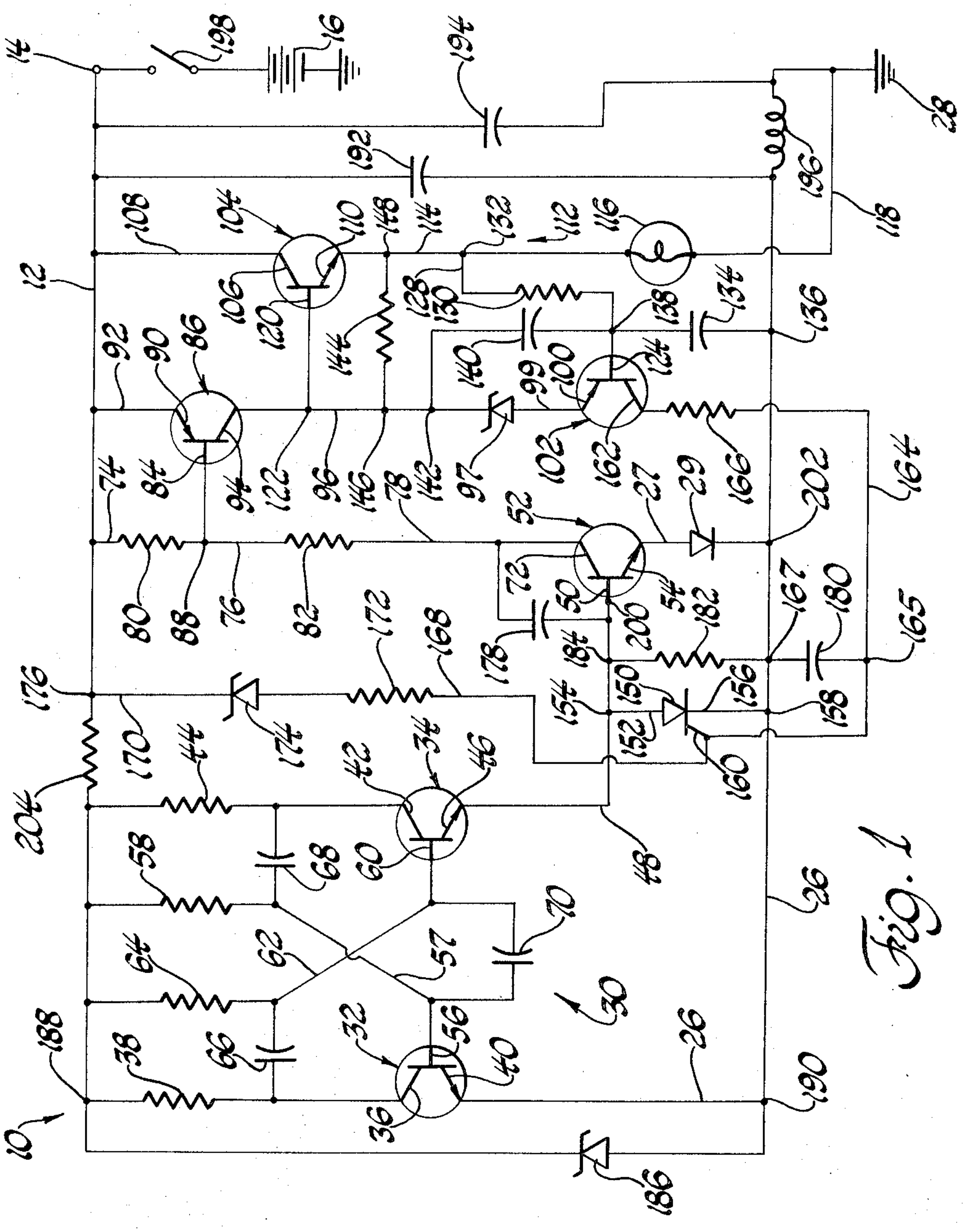
FIG. 1 is a schematic wiring diagram of a flasher type circuit employing the invention.

Referring now in greater detail to the drawings, FIG. 1 illustrates a flasher circuit 10 comprised of a first conductor 12 having an end 14 suited for connection to a suitable source of electrical potential 16 and a second conductor 26 which leads to ground as at 28.

A signal producing portion 30 of the circuit 10 is illustrated as comprising oscillator means composed of transistors 32 and 34. Transistor 32 has its collector electrode 36 connected in series with a resistor 38 leading to conductor 12 while its emitter electrode 40 is connected to conductor 26. Transistor 34 similarly has its collector electrode 42 connected, in series with a resistor 44, to conductor 12 while its emitter electrode 46 is connected, via conductor 48, to the base electrode 50 of a third transistor 52 which, in turn, has its emitter electrode 54 connected to conductor 26 via conductor means 27 which may include a diode 29.

Base electrode 56 of transistor 32 is electrically connected, via conductor 57, in series with one end of a resistor 58 which has its other end connected to conductor 12. Similarly, base electrode 60 of transistor 34 is electrically connected, via conductor 62, in series with one end of a resistor 64 which has its other end connected to conductor 12.

A first capacitor 66 has one end or side connected to a point electrically between resistor 38 and collector electrode 36 and the other end or side connected to conductor 62. A second capacitor 68 similarly has one side connected to a point electrically between resistor 44 and collector electrode 42 of transistor 34 while its other side is connected to conductor 57. Additionally, a capacitor 70 is arranged so as to have its opposite sides connected to conductors 57 and 62. Capacitor 70 is preferably provided in order to prevent the unintentional turning-on of transistors 32 and 34 due to the occurrence of possible transient voltage signals.

The collector electrode 72 of transistor 52 is connected to a voltage divider network comprised of conductors 74, 76 and 78 between which are serially connected resistors 80 and 82. Conductor 74 is connected to conductor 12 while the base electrode 84 of a fourth transistor 86 is connected to a point generally between resistors 80 and 82 as at 88 on conductor 76. Transistor 86, which may be considered as a switching transistor, has its emitter electrode 90 connected to conductor 12 as by means of a conductor 92 while the collector electrode 94 thereof is connected, via conductor 96, zener diode 97 and conductor 99 to the emitter 100 of a fifth transistor 102.

A power or load switching transistor 104 has its collector 106 connected to conductor 12 as by means of conductor 108 while its emitter 110 is connected to the load circuit 112 comprised of conductors 114, electrical load means 116 and conductor means 118 leading to ground 28. The base terminal 120 of transistor 104 is electrically connected to conductor 96 as at 122 while the base terminal 124 of transistor 102 is connected, via conductors 126, 128 and series resistor 130 to load conductor 114 as at 132. A capacitor 134 is arranged so as to have one of its sides electrically connected to conductor 26 as at 136 while its other side is connected to conductor 126 as at 138. Another capacitor 140, having one side connected to connector 126, has its other side electrically connected to conductor 96 at a point between emitter 94 and zener diode 97 as at 142. A resistor 144 is also connected as to have its opposite ends respectively electrically connected to conductors 96 and 114 as at 146 and 148.

A silicon controlled rectifier (SCR) 150 has its anode connected, via conductor 152, to conductor 48 as at 154, while its cathode is connected by means of conductor 156 to conductor 26 as at 158. The gate electrode 160 of SCR 150 is electrically connected to collector 162 of transistor 102 as by means of conductor 164 and resistor 166. The gate electrode 160 is also connected via conductors 168, 170 and serially arranged resistor 172 and zener diode 174, to conductor 12 as at 176.

Generally, in order to make an SCR conductive, forwardly, it is necessary to apply a voltage across the anode to cathode terminals of the SCR (making the anode positive, +, with respect to the cathode) and at the same time apply a voltage (or current flow) to the gate-to-cathode circuit by making the gate positive, +, with respect to the cathode. Of course, if after the SCR is made conductive, current flow from the anode to cathode is interrupted, the SCR will again go into its non-conductive state.

A capacitor 178 is connected in parallel with the base-collector diode of transistor 52 while a capacitor 180 has one side electrically connected to conductor 164, as at 165, and its other side connected to ground conductor 26, as at 167. A resistor 182 may be situated as to have one end connected to conductor 26, as at 167, while its other end is connected to conductor 48 as at 184.

Depending upon the environment in which the invention is to operate, it might be preferred to provide for voltage regulation as by, for example, a zener diode 186 arranged as to be connected to conductors 12 and 26 as at 188 and 190. Further, it may well be beneficial to, in certain circumstances, provide capacitors 192 and 194 across conductors 12 and 26 as well as an inductance 196 which would collectively act as a noise filter to prevent electrical noise from spuriously triggering any of the semiconductors into a conductive state.

OPERATION OF THE INVENTION

In view of the above, it can be seen that each of transistors 32, 34, 52 and 104 is of the N-P-N type while transistors 86 and 102 are of the P–N–P type. Accordingly, during normal conduction, in the N–P–N type, the emitter will be negative with respect to both the collector and base while the collector is positive with respect to both the emitter and base. In the P–N–P type, normal operation or conduction is achieved when the emitter is positive with respect to both the collector and base while the collector is negative with respect to both the emitter and base.

Further, transistors 32 and 34 comprise a multivibrator the operation of which is generally as follows. Assuming that a related control switch 198 is closed, let it also be assumed that transistor 32 has just switched "on", creating current flow through the emitter-collector circuit 40, 36, and that transistor 34 has switched "off" or to its non-conducting state. At this particular instant capacitor 66 was fully charged and the side thereof connected to resistor 64 was negative with respect to the other side of capacitor 66 which is connected to resistor 38 and collector 36. The circuit through emitter-collector circuit 36, 40 is completed to ground 28 as by conductor 26. At this time capacitor 68 will have been discharged.

Capacitor 66 now starts charging toward the opposite polarity through resistor 64 by virtue of being essentially connected to conductor 26 when transistor 32 is conducting and the emitter-collector circuit thereof is completed. It can also be seen that because of the charge existing on capacitor 66, at the instant that transistor 32 went into conduction, and its connection to base electrode 60 of transistor 34 via conductor 62, the emitter-base electrodes of transistor 34 are reverse biased (the base being negative with respect to emitter 46) thereby keeping transistor 34 in an off or non-conducting state. At this same time, capacitor 68 will start to charge essentially through the emitter-base circuit of transistor 32 and resistor 44. This charging current holds transistor 32 conductive or "hard-on;" further, even when charging of capacitor 68 is completed, the transistor 32 will remain conductive by virtue of the base current provided by resistor 58.

As the potential across capacitor 66, holding transistor 34 "off," is reduced, a condition is finally attained where the capacitor 66 voltage can no longer maintain transistor 34 in the non-conducting state. As transistor 34 starts to become conductive, by virtue of a biasing current through resistor 64, the collector-to-emitter voltage thereof drops and the charged capacitor 68 now starts to discharge through the emitter-base circuit of transistor 32, resulting in a reverse bias driving transistor 32 into non-conduction.

When transistor 32 is thusly driven into non-conduction, the voltage across its emitter 40 and collector 36 increases causing capacitor 66 to again start charging through the emitter-base circuit of conductive transistor 34.

In this new state (transistor 34 being conductive) capacitor 68 starts to charge toward the opposite polarity through resistor 58 by virtue of being connected to conductor 26 through the conducting transistor 34. When transistor 34 was switched into conduction, capacitor 68 was negatively charged on its side connected to conductor 57, with respect to its side connected between resistor 44 and collector 42. Further, the polarity on capacitor 68, at the time of switching transistor 34 "on," produces a reverse bias on transistor 32.

During the time that transistor 34 is conducting capacitor 66 is being charged so that its end or side connected to resistor 64 and conductor 62 will become negative with respect to its side connected between resistor 38 and collector 36. Such charging of the capacitor 66 is the consequence of the base current flow through transistor 34 which also serves to hold the transistor 34 in its "on" or conductive state. It should be apparent that transistor 32 is also maintained conductive for some period after capacitor 66 has been fully charged because of the base bias provided by resistor 64.

However, as capacitor 68 continues to discharge and the voltage thereacross approaches zero, the voltage holding transistor 32 in a non-conducting state decreases and transistor 32 starts to again become conductive. This initiates the regenerative cycle which results in the rapid "turn on" of transistor 32 and "turn off" of transistor 34 as well as the subsequent rapid "-turn off" of transistor 32 and "turn on" of transistor 34. In this arrangement resistors 38 and 44 serve to respectively limit the collector currents of transistors 32 and 34 while resistor 64 and capacitor 66 combine to determine the "off" or non-conducting time of transistor 34 and, similarly, resistor 58 and capacitor 68 combine to determine the "off" or non-conducting time of transistor 32.

It can be seen that when transistor 34 is in its conducting state, the emitter-base circuit of transistor 52 is biased into conduction thereby completing the circuit through the emitter 54 and collector 72 of transistor 52. When transistor 52 is thusly driven into conduction, a circuit is completed through conductors 78, 76 and 74, collector electrode 72, emitter 54 and conductor means 27 causing a voltage drop to occur across resistor 80 and resistor 82 thereby causing point 88 and base 84 to be positive with respect to emitter 90. Consequently, switching transistor 86 is turned "on" completing a circuit through the emitter 90 and collector 94 thereby placing the base 120 of transistor 104 at a positive potential with respect to the emitter 110 thereof. This, of course, causes power or load transistor 104 to become conductive with a circuit being completed through the load circuit including conductors 108, collector 106, emitter 110, conductor 114, load means 116 and conductor 118 to ground 28. As should be apparent, the diagrammatically depicted load means 116 may in fact be comprised of, for example, one or a plurality of lamps or bulbs and, as is often the case, some of such bulbs could be located within the interior of the vehicular passenger compartment, as operator signal read-outs, while others could be located externally of the vehicle as indicators to pedestrians and vehicular traffic.

In view of the preceding, it can be seen that, in the embodiment disclosed, every time that oscillator or multivibrator transistor 34 is turned "on" the buffer transistor 52, switching transistor 86 and load transistor 104 are likewise turned "on." The contrary is, of course, true; that is, whenever transistor 34 is in its "off" or non-conductive state, transistors 52, 86 and 104 are also in their "off" or non-conductive states.

Now, considering the short protection means, comprised generally of transistor 102 and SCR 150, it will be remembered that in order to make SCR 150 conductive, both the anode and gate thereof have to be made positive with respect to the cathode. Accordingly, it can be seen that whenever transistor 102 is "off" or in a non-conductive state, the circuit described by resistor 166 and conductor 164 is open by virtue of no conduction through the emitter-collector circuit of transistor 102. Further, whenever multivibrator transistor 34 is "on" the anode of SCR 150 will be positive (+) with respect to the cathode thereof which is negative (−) by virtue of its connection to conductor 26 as at 158. Therefore, it can be seen that whenever transistor 34 is "on," SCR 150 is made ready for conduction with the exception that there is neither a current or positive voltage applied to gate 160.

Now, referring to load or power transistor 104, it can be seen that if a short should occur in the load or load circuit means 112, the current flow will greatly increase through both transistor 86 and 104. That is, not only will the current flow through the collector-emitter circuit of transistor 104 become abnormally high, but also will the current flow through the base-emitter diode of transistor 104 become abnormally high. However, as shown, the emitter terminal 100 of transistor 102 is effectively connected through zener diode 97 to the base terminal 120 of transistor 104 while the base terminal 124 of transistor 102 is effectively connected to the emitter terminal 110 of transistor 104.

As can be seen, the polarity of the increased voltage drop across the base-emitter diode of transistor 104, due to the short condition, is correct to cause transistor 102 to become conductive. It should be apparent that zener diode 97 is provided in order to prevent transistor 102 from becoming conductive until the voltage across the base-emitter terminals of transistor 104 is of such a predetermined magnitude as results from a short. Therefore, the normal voltage drop across the base-emitter of power transistor 104 would be of insufficient magnitude to cause conduction in zener 97. Resistor 130 is, of course, employed as a current limiter when transistor 102 is made conductive.

When the short sensing transistor 102 is made conductive, as set out above, a circuit is completed through the emitter-collector of transistor 102, resistor 166 (which functions as a current limiter) and conductor 164 whereby current is supplied to gate 160 of SCR 150 causing the SCR 150 to become conductive through the anode-cathode thereof establishing a circuit as from point 154 of conductor 48 to point 158 of conductor 26. Consequently, when SCR 150 thereby becomes conductive, the current from transistor 34, which was supplying such current to the base 50 of transistor 52, is now shunted past transistor 52. This, of course, causes transistors 52, 86 and 104 (as well as the load) to turn "off."

The function of diode 29 may now be better appreciated; that is, it can be seen to provide an additional or increased voltage requirement as between points 200 and 202 before transistor 52 will conduct. This value of increased voltage is selected as to be greater than the voltage drop across the anode-to-cathode of SCR 150 when the SCR is conducting thereby permitting SCR 150 to act as an effective shunt.

In view of the above, it can be seen that the invention provides means sensitive to the occurrence of an increase in voltage across the base-emitter junction of a load transistor, as occasioned by the occurrence of a short condition in the load circuit, which means is effective for causing the load transistor to be shut-down thereby precluding damage to such load transistor from abnormally high current flow therethrough.

Other inventive features are also disclosed in the circuit of FIG. 1; for example, zener diode 174 is effective to, at times, also cause SCR 150 to become conductive. That is, should any reason high line voltage spikes appear such spikes would also produce excessively high currents in, for example, transistors 86 and 104. Accordingly, if such high voltage spikes should occur, they would cause zener diode 174 to become conductive thereby applying a positive potential to gate 160 of SCR 150 causing the anode-to-cathode of SCR to become conductive resulting in the shut-down of transistors 52, 86 and 104 as previously described.

Capacitors 134 and 140 are preferably provided in order to create a slight time delay in the "turn-on" of transistor 102 thereby preventing spurious conduction of transistor 102; while capacitor 180 provides both a filter and time delay effect for the "turn-on" of SCR 150.

In addition to the above, capacitors 192, 194 and inductance 196 may be provided in the manner shown in order to define an electrical noise filter preventing the spurious triggering of any of the semiconductors to their "on" state. A resistor 204 may be included in conductor 12 to function as a current limiter to the zener means or diode 186 which may be provided as a voltage regulator for the multivibrator. Resistors 182 and 144, of course, take care of any leakage currents with respect to transistors 52 and 104.

Figure 2:
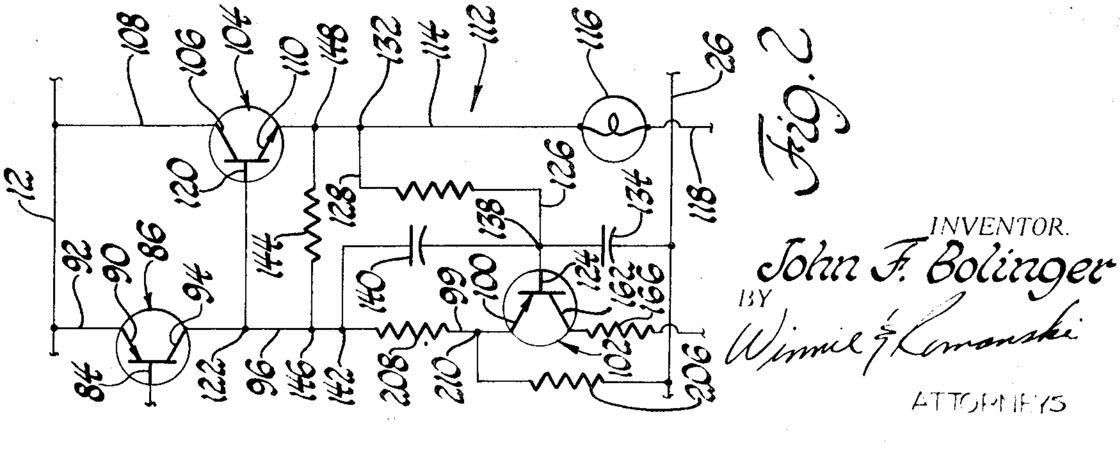
FIG. 2 is a fragmentary schematic wiring diagram illustrating a second embodiment of the invention.

FIG. 2 illustrates a second embodiment of the invention. Only that fragmentary portion of the circuitry of FIG. 1 is reproduced in FIG. 2 as is believed necessary to adequately disclose the operation of the second embodiment.

In comparing FIGS. 1 and 2 it can be seen that the zener diode 97 of FIG. 1 has been eliminated in the circuit of FIG. 2 and effectively replaced by resistors 206 and 208 which function as a voltage divider having the emitter 100 of transistor 102 connected as to the junction 210 thereof.

The circuit of FIG. 2 operates essentially as the circuit of FIG. 1 except that now when transistor 86 becomes conductive current flows through resistors 206 and 208. However, the voltage across resistor 208 is of the opposite polarity to that required to turn transistor 102 "on." Therefore, the voltage across the base-emitter terminals of transistor 104 must exceed the voltage across resistor 208 before transistor 102 will conduct. However, with a normal load condition, the voltage across 208 prevents transistor 102 from conducting until a short condition occurs in the load circuit at which time the voltage across the base-emitter terminals of transistor 104 exceeds the voltage drop across resistor 208. Accordingly, it can be seen that this arrangement provides an easy and simple means for "setting" or determining the point or value of voltage across base 120 to emitter 110 at which transistor 102 will conduct. That is, by varying the value of resistance 208 to, for example, a low set voltage transistor 102 and SCR 150 will be turned "on" at a lower value of short circuit current.

It should be apparent that functional equivalents could be substituted for the various sections of the circuitry as well as components or elements contained therein. For example, the oscillator or timer section 30 may be a multivibrator, triggered flip-flop, or any other suitable circuit which will provide an output of cyclically recurring pulses of D.C. current. Also, as should be apparent, the circuitry disclosed could be practiced employing P–N–P transistors for those that are shown as N–P–N and vice versa where appropriate polarity changes are made as is well known in the art.

Although only two embodiments of the invention have been disclosed and described, it should be apparent that other embodiments and modifications of the invention are possible within the scope of the appended claims.

I claim:

1. A flasher circuit for vehicle lamps adapted to alternately connect and disconnect a voltage source and a lamp load, said flasher comprising a load switching transistor having an input circuit extending between its emitter and base and an output circuit with the output circuit extending between its emitter and collector and being adapted to connect the lamp load with the voltage source, an oscillator adapted to produce control signal impulses, a transistor amplifying means having its input circuit connected with the output circuit of said oscillator and having its output circuit connected with the input circuit of said load switching transistor whereby said load switching transistor is switched between on and off conditions in response to the control signal impulses, voltage responsive means including a control transistor having an input circuit extending between its emitter and base and an output circuit extending between its emitter and collector and including a voltage reference device, the input circuit of the control transistor being connected across the emitter and base of the load switching transistor in series circuit with said voltage reference device, the emitter and base of the control transistor being poled oppositely from the emitter and base of the switching transistor in said series circuit whereby the output circuit of said control transistor becomes conductive when the voltage across the emitter and base of the load switching transistor exceeds a value determined by said voltage reference device, semiconductor switching means having an output circuit connected across the input circuit of said transistor amplifying means and having an input circuit connected with the output circuit of the control transistor whereby said semiconductor switching means becomes conductive and disables the transistor amplifying means to prevent application of the control signal impulses to the input circuit of the load switching transistor when a short circuit across said lamp load causes the voltage across the input circuit of the load switching transistor to exceed said predetermined value.

2. A flasher circuit as defined in claim 1 wherein said reference voltage device comprises a Zener diode.

3. The invention as defined in claim 1 wherein said reference voltage device comprises voltage divider resistors.

4. The invention as defined in claim 1 wherein said semiconductor switching means comprises a silicon controlled rectifier having its anode and cathode connected across the input circuit of the transistor amplifying means and having its cathode and gate connected across the output circuit of said control transistor.

5. The invention as defined in claim 4 and further including a second Zener diode adapted to be connected across said voltage source through the gate and cathode of the silicon controlled rectifier whereby said transistor amplifying means is disabled in response to excessive voltage from said voltage source.

6. The invention as defined in claim 1 and further including a capacitor connected across the input circuit of said control transistor to delay the turn-on of said transistor and thus avoid unwanted switching of said load switching transistor in response to initial in-rush current when the lamp load is cold.

7. The invention as defined in claim 4 wherein a semiconductor diode is connected in series with the input circuit of said transistor amplifying means and poled for conduction in the same direction as said input circuit whereby the voltage drop across the anode-cathode of said silicon controlled rectifier when the same is conductive in insufficient to cause conduction through the input circuit of said amplifying means.

* * * * *